US008599329B2

(12) United States Patent
Kang et al.

(10) Patent No.: US 8,599,329 B2
(45) Date of Patent: Dec. 3, 2013

(54) LIQUID CRYSTAL DISPLAY MODULE AND LIQUID CRYSTAL DISPLAY DEVICE HAVING THE SAME

(75) Inventors: Jeong Il Kang, Yongin-si (KR); Kun Ho Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 13/233,614

(22) Filed: Sep. 15, 2011

(65) Prior Publication Data

US 2012/0069262 A1 Mar. 22, 2012

(30) Foreign Application Priority Data

Sep. 20, 2010 (KR) .................. 10-2010-0092548

(51) Int. Cl.
*G02F 1/1333* (2006.01)
(52) U.S. Cl.
USPC ............... 349/58; 349/60; 349/65; 362/97.2; 362/612; 362/631; 362/634
(58) Field of Classification Search
USPC ........ 349/58, 60, 150, 65; 362/631–634, 612, 362/613, 611, 97.2, 97.1
See application file for complete search history.

(56) References Cited

U.S. PATENT DOCUMENTS

| 2008/0297701 A1 | 12/2008 | Lee et al. |
| 2009/0135583 A1 | 5/2009 | Hillman et al. |
| 2010/0079977 A1 | 4/2010 | Lee et al. |

FOREIGN PATENT DOCUMENTS

EP 2077464 A1 7/2009

OTHER PUBLICATIONS

Communication dated Dec. 22, 2011 from the European Patent Office in counterpart European application No. 11180817.6.

*Primary Examiner* — Thoi Duong
(74) *Attorney, Agent, or Firm* — Sughrue Mion, PLLC

(57) ABSTRACT

A liquid crystal display device has a liquid crystal display module, including: a bottom chassis having a bottom side on which an open hole is formed, a printed circuit board adjacent to the open hole and supported at an inner face of the bottom side on which a plurality of light emitting diodes are is mounted, and a coupling part which extends from the printed circuit board, passes through the open hole and contacts an outer face of the bottom side of the bottom chassis, so as to maintain coupling between the bottom chassis and the printed circuit board.

33 Claims, 7 Drawing Sheets

LIQUID CRYSTAL DISPLAY MODULE AND LIQUID CRYSTAL DISPLAY DEVICE HAVING THE SAME

CROSS-REFERENCE TO RELATED APPLICATION

This application claims the benefit of Korean Patent Application No. 10-2010-92548 filed on Sep. 20, 2010 in the Korean Intellectual Property Office, the disclosure of which is incorporated herein by reference.

BACKGROUND

1. Field

Apparatuses consistent with exemplary embodiments relate to a liquid crystal display module with a structure for coupling a printed circuit board to a bottom chassis, as well as a liquid crystal display device having the same.

2. Description of the Related Art

A liquid crystal display (LCD) displays images using electrical and optical properties of liquid crystals may display images. The LCD has a number of advantageous features including reduced thickness, light weight, good performance at a low voltage and low power consumption, etc., thus being widely used in various industrial applications.

A related art LCD device generally includes an LCD panel fabricated by charging liquid crystals between two transparent substrates and applying voltage thereto to change orientation of liquid crystal molecules and vary light transmission, thus optically displaying images. The related art LCD device further includes an LCD module to provide light to the LCD panel.

To produce a slim LCD device by decreasing a thickness thereof, an edge type LCD module having a light emitting diode (LED) as a light source may be used.

An edge type LCD module may have a printed circuit board (PCB) mounted on a lateral side of the module wherein a plurality of LEDs are mounted on the PCB. Light emitted from the LEDs passes through a light guide plate, is output from a front side of the LEDs, and enters the LCD panel.

The LCD device is fabricated by fixing the LCD module to a structure. For example, using a clamp screw, the PCB of the LCD module is assembled with a '⌐'-shaped metal structure or another structure having a different morphology, and then, is fixed to a bottom chassis.

SUMMARY

One or more exemplary embodiments provide an LCD module that secures a PCB to a bottom chassis and an LCD device having the LCD module.

One or more exemplary embodiments also provide an LCD module is provided that is capable of protecting surrounding structures from damage by a coupling device used to fix a PCB to a bottom chassis, as well as an LCD device having the LCD module.

According to an aspect of an exemplary embodiment, there is provided an LCD module including: an LCD panel; a bottom chassis having a lateral side, and a bottom side to support the LCD panel wherein at least one open hole is formed on the bottom side; a PCB on which a plurality of LEDs is mounted to provide light to the LCD panel; and at least one coupling part provided on a bottom of the PCB, which is formed to correspond to the open hole and partially passes through the open hole while partially contacting the bottom side of the bottom chassis, thus securing the PCB to the bottom chassis.

The coupling part may include a support part fixed to a rear side of the PCB, and a fixing part (such as a retainer) extending from the support part and passing through the open hole to contact a rear side of the bottom chassis, in turn securing the PCB to the bottom chassis.

The fixing part may include a fitting slot to be inserted into the open hole by sliding movement, after the fixing part extends from the support part and passes through the open hole, thereby supporting the rear side of the PCB while the PCB faces the bottom side of the bottom chassis.

The fixing part having the fitting slot may include a vertical part protruded from the support part and a horizontal part which is bent at one end of the vertical part and extends in parallel, wherein a distance between the horizontal part and the PCB is substantially identical to a thickness of the bottom side of the bottom chassis.

The fixing part may further include a hook protrusion protruded from the horizontal part. A hook groove, into which the hook protrusion is inserted and engaged by sliding movement of the PCB, may be placed near the open hole on the rear side of the bottom chassis.

Alternatively, the fixing part may extend in a curved manner from the support part, to maintain coupling of the PCB and the bottom chassis through elastic strain (or deformation).

Alternatively, the fixing part may include a part extending from the support part, a rotational lever part provided on the extending part, and an elastic element to elastically support and press the rear side of the bottom chassis.

The lever part has a hook protrusion, while a hook groove corresponding to the hook protrusion may be provided near the open hole at the rear side of the bottom chassis.

The elastic element may further include a torsion spring combined with the lever part or a rotational axis of the extending part.

To restrict movement of the PCB while guiding the PCB to a coupling site, the bottom chassis may further have a position fixing protrusion protruding from the bottom side thereof and supporting one side of the PCB.

Each of the LEDs has a light emitting part to irradiate light, which is arranged substantially perpendicular to a surface of the PCB having the LEDs mounted thereon, and the light is emitted in a direction parallel to the PCB.

A light guide part which has a plane for light incidence facing the light emitting part and a light exit plane substantially perpendicular to the light incidence plane may be further included. At least a part of the PCB may be placed below the light guide part.

A reflection part to direct the irradiated light from the light emitting part toward the PCB panel may be provided at a bottom end of the light guide part.

The reflection part may be placed on top of the bottom side while covering a part of the PCB.

A rear side of the LED present on the opposite side of the light emitting part may be arranged adjacent to this opposite side.

The PCB may further include a connector to supply power to the plural LEDs.

The connector protrudes toward the rear side of the PCB, and the bottom chassis may further have a connector coupling hole corresponding to the connector on the bottom side thereof.

According to an aspect of another exemplary embodiment, there is provided an LCD device including: an LCD panel; a bottom chassis having a lateral side and a bottom side having a lateral side and a bottom side to support the LCD panel, wherein at least one open hole is formed on the bottom side; a PCB on which a plurality of LEDs is mounted to provide light to the LCD panel; and at least one coupling part provided on a bottom of the PCB, which is formed to correspond to the open hole and partially passes through the open hole while partially contacting the bottom side of the bottom chassis, to secure the PCB to the bottom chassis.

The coupling part may include a support part fixed to a rear side of the PCB, and a fixing part extending from the support part and passing through the open hole to contact a rear side of the bottom chassis, to secure the PCB to the bottom chassis.

The fixing part may include a fitting slot to be inserted into the open hole by sliding movement, after the fixing part extends from the support part and passes through the open hole, such that the rear side of the PCB may be supported while the PCB faces the bottom side of the bottom chassis.

The fixing part having the fitting slot may include a vertical part protruded from the support part and a horizontal part which is bent at one end of the vertical part and extends in parallel, wherein a distance between the horizontal part and the PCB is substantially equal to a thickness of the bottom side of the bottom chassis.

The fixing part may further include a hook protrusion protruded from the horizontal part. A hook groove, into which the hook protrusion is inserted and engaged by sliding movement of the PCB, may be placed near the open hole on the rear side of the bottom chassis.

Alternatively, the fixing part may extend in a curved manner from the support part, to maintain coupling of the PCB and the bottom chassis through elastic strain.

Alternatively, the fixing part may include a part extending from the support part, a rotational lever part prepared on the extending part, and an elastic element to elastically support and press the rear side of the bottom chassis.

The lever part has a hook protrusion, while a hook groove corresponding to the hook protrusion may be provided near the open hole at the rear side of the bottom chassis.

The elastic element may further include a torsion spring combined with the lever part or a rotational axis of the extending part.

In order to restrict movement of the PCB while guiding the PCB to a coupling site, the bottom chassis may further have a position fixing protrusion protruded from the bottom side thereof to support one side of the PCB.

Each of the LEDs has a light emitting part to irradiate light, which is arranged substantially perpendicular to a surface of the PCB having the LEDs mounted thereon, and the light is emitted in a direction substantially parallel to the PCB.

In order to guide the light irradiated from the light emitting part, a light guide part which has a plane for light incidence facing the light emitting part and a light exit plane perpendicular to the light incidence plane may be further included. At least a part of the PCB may be placed below the light guide part.

A reflection part to direct the irradiated light from the light emitting part toward the PCB panel may be provided at a bottom end of the light guide part.

The reflection part may be placed on top of the bottom side while covering a part of the PCB.

A rear side of the LED present on the opposite side of the light emitting part may be arranged adjacent to this opposite side.

The PCB may further include a connector to supply power to the plural LEDs.

The connector may be protruded toward the rear side of the PCB and the bottom chassis may further have a connector coupling hole corresponding to the connector on the bottom side of the bottom chassis.

Furthermore, a driver PCB having a driver circuit part mounted thereon and electrically connected thereto to supply driving power may be fixed to the rear side of the bottom chassis.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Exemplary embodiments of an LCD device will be described with the accompanying drawings.

Figure 1:
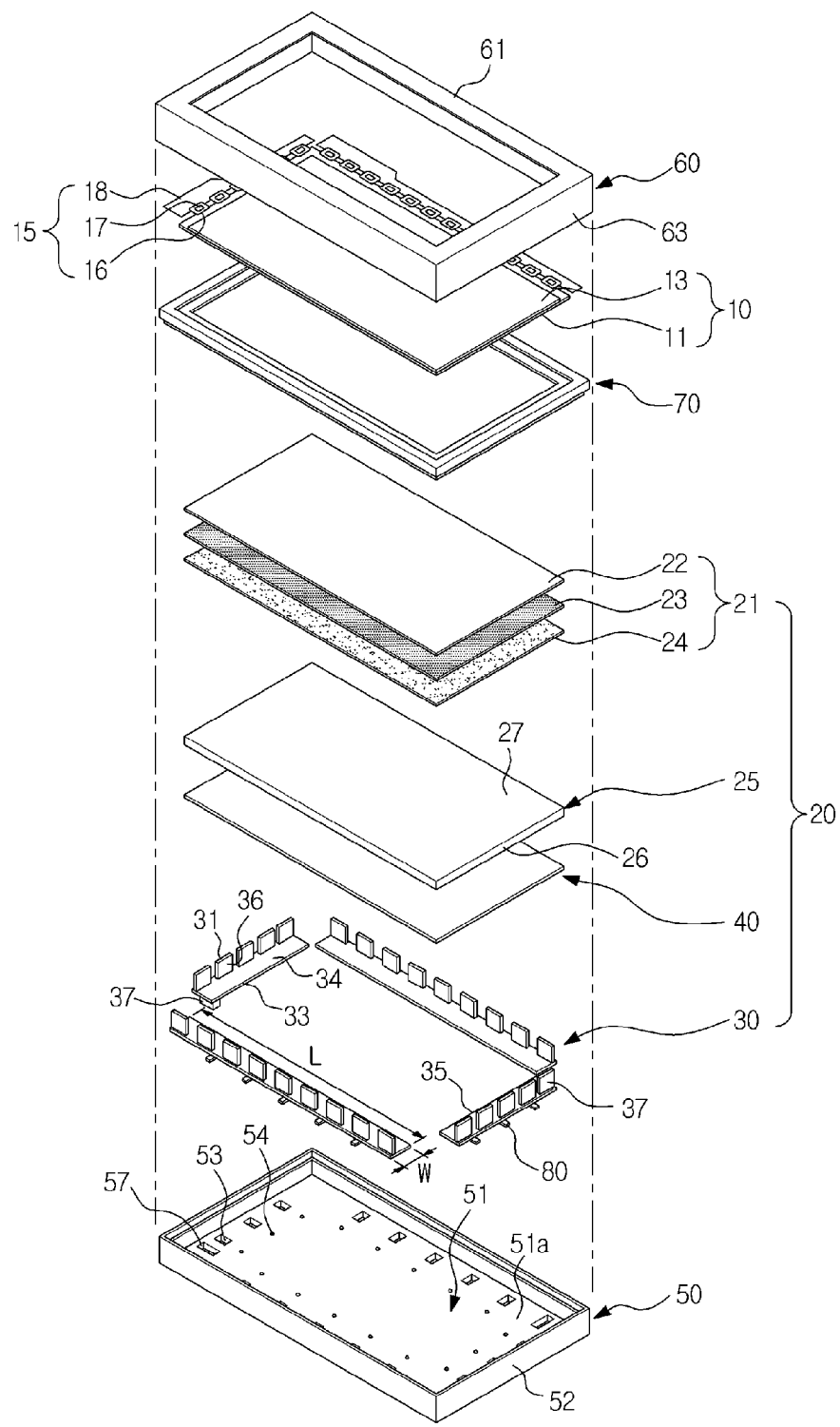
FIG. 1 is an exploded perspective view illustrating an LCD device according to an exemplary embodiment.
Figure 2:
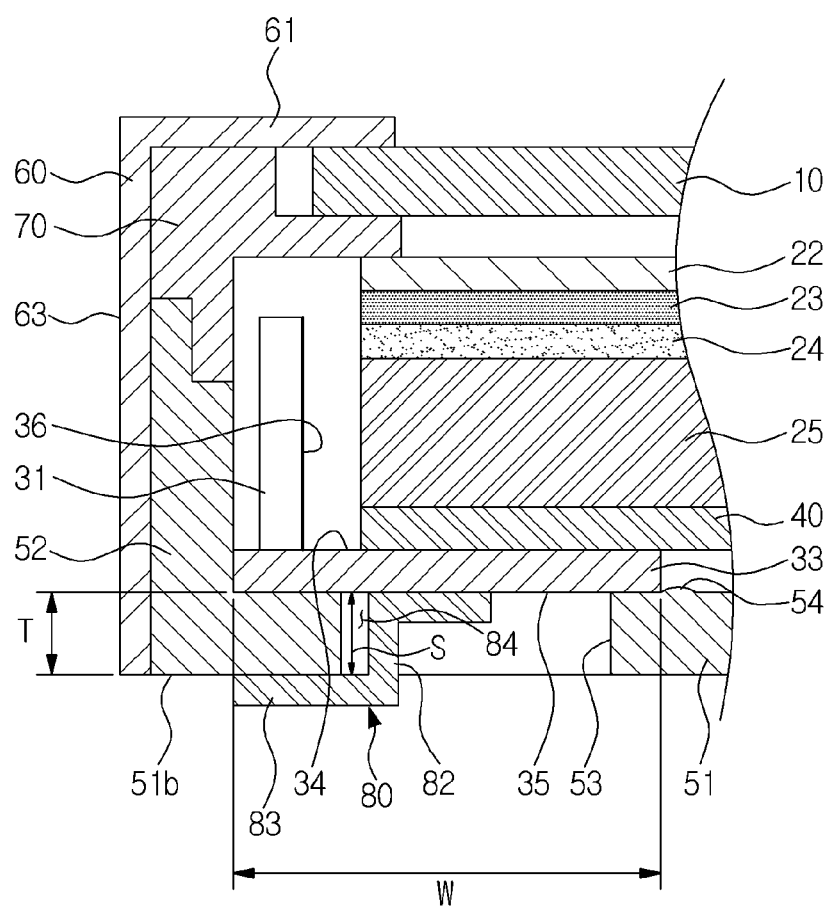
FIG. 2 is a cross-sectional view illustrating a combined structure of an LCD device according to an exemplary embodiment.

FIG. 1 illustrates an exploded perspective view of an LCD device according to an exemplary embodiment; and FIG. 2 is a cross-sectional view illustrating a combined structure of an LCD device according to an exemplary embodiment.

Referring to FIGS. 1 and 2, the LCD device may include an LCD panel 10, an LCD module 20 placed in the rear side of the LCD panel 10, a middle mold 70 to maintain a gap between the LCD panel 10 and the LCD module 20, and a top chassis 60 and a bottom chassis 50 placed on top and bottom of the LCD panel 10 and the LCD module 20, respectively.

The top chassis 60 may have a bezel part 61 surrounding a peripheral side of the LCD panel 10, and a lateral part 63 bent at one end of the bezel part 61. The bezel part 61 refers to a width from an outline of the LCD panel 10 to an active area in which images are displayed.

The LCD panel 10 includes a thin film transistor substrate 11 on which a thin film transistor is formed, a color filter substrate 13 facing the thin film transistor substrate 11, and a liquid crystal layer (not shown) between the thin film transistor substrate 11 and the color filter substrate 13.

The thin film transistor substrate 11 has a driver part 15 placed on one side of the substrate, to apply a drive signal.

The driver part 15 includes a flexible printed circuit board (FPC) 16, a driver chip 17 mounted on the FPC 16, and a circuit board 18 connected to the other side of the FPC 16.

The driver part 15 may adopt a chip-on-film (COF) structure, although other structures as would be understood by one skilled in the art, such as tape-carrier-package (TCP), chip-on-glass (COG), or the like may be utilized. The driver part 15 may be integrated with the thin film transistor substrate 11.

Although the LCD panel 10 displays images by regulating arrangement of liquid crystal layers, the LCD panel is substantially a non-light emitting device and must receive light from the LCD module 20 placed behind the LCD panel 10.

The LCD module 20 may include a plurality of optical sheets 21 provided below the LCD panel 10, a light guide part 25 placed under the optical sheets 21, a light source unit 30 to provide light to the light guide part 25, and a reflection part 40 provided under the light guide part 25.

Each of the optical sheets 21 includes a protective film 22, a prism film 23 and a diffusion film 24.

The diffusion film 24 has a coating layer in a ball shape formed on a base plate to diffuse light from the light guide part 25 and provide the diffused light to the LCD panel 10.

To collect the diffused light from the diffusion film 24 in a direction substantially perpendicular to a flat plane of the LCD panel 10, triangular prisms are aligned in a constant arrangement on top of the prism film 23.

In general, two prism film sheets 23 are used and microprisms are formed at an angle on the prism films 23.

The light passed through the prism films 23 substantially progresses in a vertical direction and provides substantially uniform luminance.

The protective film 22 is located above the prism film 23 to protect the prism film 23 from scratches, dust, etc.

The light guide part 25 is prepared using an acryl resin such as polymethylmethacrylate (PMMA) or polymethylstyrene (as a copolymer of methylmethacrylate and styrene), and substantially uniformly supplies light from the light source unit 30 to the diffusion film 24.

The light guide part 25 has a light incidence plane 26 prepared at a lateral end to allow light emitted from the light source unit 30 to be incident therethrough, a light exit plane 27 facing the diffusion film 24, and a reflection plane (not shown) present at the opposite side of the light exit plane 27.

The reflection part 40 is positioned below the light guide part 25, and reflects again the downward-oriented light, and emits the same to the light guide part 25.

The reflection part 40 may be prepared using a plastic material such as polyethylene terephthalate (PET) or polycarbonate (PC); other materials as understood by those in the art as having a structure that performs the reflecting function may be substituted therefor.

The light source unit 30 includes a plurality of LEDs 31 to emit light and a PCB 33 having the plural LEDs 31 mounted thereon, on which a conductive pattern is formed to apply electrical signal to the LEDs 31.

The plural LEDs 31 may include multiple LEDs 31 to emit white light, or have a combination of LEDs 31 to emit red, green and blue light, respectively.

The LEDs 31 may be oriented substantially perpendicular to the surface of the PCB 33 to emit light to the light incidence plane 26 of the light guide part 25.

Therefore, a light emitting plane 36 of each of the LEDs 31 may be located perpendicular to a top side 34 of the PCB 33, in turn facing the light incidence plane 26 of the light guide part 25.

The PCB 33 may be a metal PCB fabricated using an Si steel sheet, a zinc plated steel sheet and/or an aluminum disk material, which have high thermal conductivity, or an FPCB.

The PCB 33 has a horizontal length (L), which corresponds to a distance between the PCB and the light guide part 25 facing thereto, and a longitudinal length (W), which extends in a light irradiation direction of the LED 31 by a certain distance. As a result, the PCB 33 may be formed in a substantially rectangular shape having a thickness.

The PCB 33 may send drive signals to the LEDs 31 and transfer heat from the LEDs 31.

For this purpose, a rear side 35 of the PCB 33 opposite a top side 34 of the same, on which the LEDs 31 are mounted, may be in close contact with a bottom side 51 of the bottom chassis 50.

The bottom chassis 50 may have a bottom side 51, on which the LCD module 20 is placed, and a lateral side 52 extending upward along circumference of the bottom side 51.

The bottom chassis 50 may be fabricated using a thermally conductive metal material to transfer heat from the light source unit 30 to the outside.

The rear side 35 of the PCB 33 closely contacts the bottom side 51, such that heat dissipation occurs over a contact area.

Although not illustrated, the bottom chassis 50 may have at least one additional circuit board placed on the rear side, to drive the LCD device. In other words, when the LCD device is employed in a broadcast signal receiver (e.g., a television), a main circuit board equipped with a power supply circuit board, various signal processing connectors and/or signal processing ICs may be affixed (e.g., screw-clamped) to the LCD device. The driver part 15 of the LCD panel may be fixed to any peripheral device behind the bottom chassis 50.

The PCB 33 may have a connector 37 to supply power to the LEDs 31.

The connector 37 is used for electrical connection between the LEDs 31 and a driver PCB (not shown) mounted on the rear side of the bottom chassis 50 to apply a drive power to the LEDs 31. In the exemplary embodiment, the connector may be protruded from the rear side 35 of the PCB 33 and pass through a connector hole 57 present in the bottom side 51 of the bottom chassis 50.

The connector 37 passing through the connector hole 57 may be combined with another connector mounted on one end of an electrical wiring connected to a driving board.

Although not illustrated in exemplary embodiments, the connector 37 may be provided in an integrated form with a coupling part 80 as described below.

The LEDs 31 may be placed at a site adjacent to one peripheral side of the PCB 33. That is, the LEDs 31 may be placed in on a top side 34 of the PCB 33 so as to be aligned at a site adjacent to a lateral side 52 of the bottom chassis 52 when the light source unit 30 is provided on the bottom chassis 50.

In this case, a part of the longitudinal length W extending in a width direction of the PCB 33 may overlap on a bottom end of the reflection part 40.

According to the foregoing configuration, a bezel part 61 of the top chassis 60 covering around the peripheral side of the LCD panel 10 may have a substantially decreased width, so that immersive viewing of a screen and screen magnification effects may be attained.

In the exemplary embodiment, four light source units 30 are provided near four lateral sides of the light guide part 25, respectively. However, two light source units may be mounted on two opposite sides of the light guide part 25 or only one light source unit may be provided near one lateral side of the light guide part 25.

Such light source unit(s) 30 may be fixed to the bottom chassis 50 via the coupling part 80.

Figure 3:
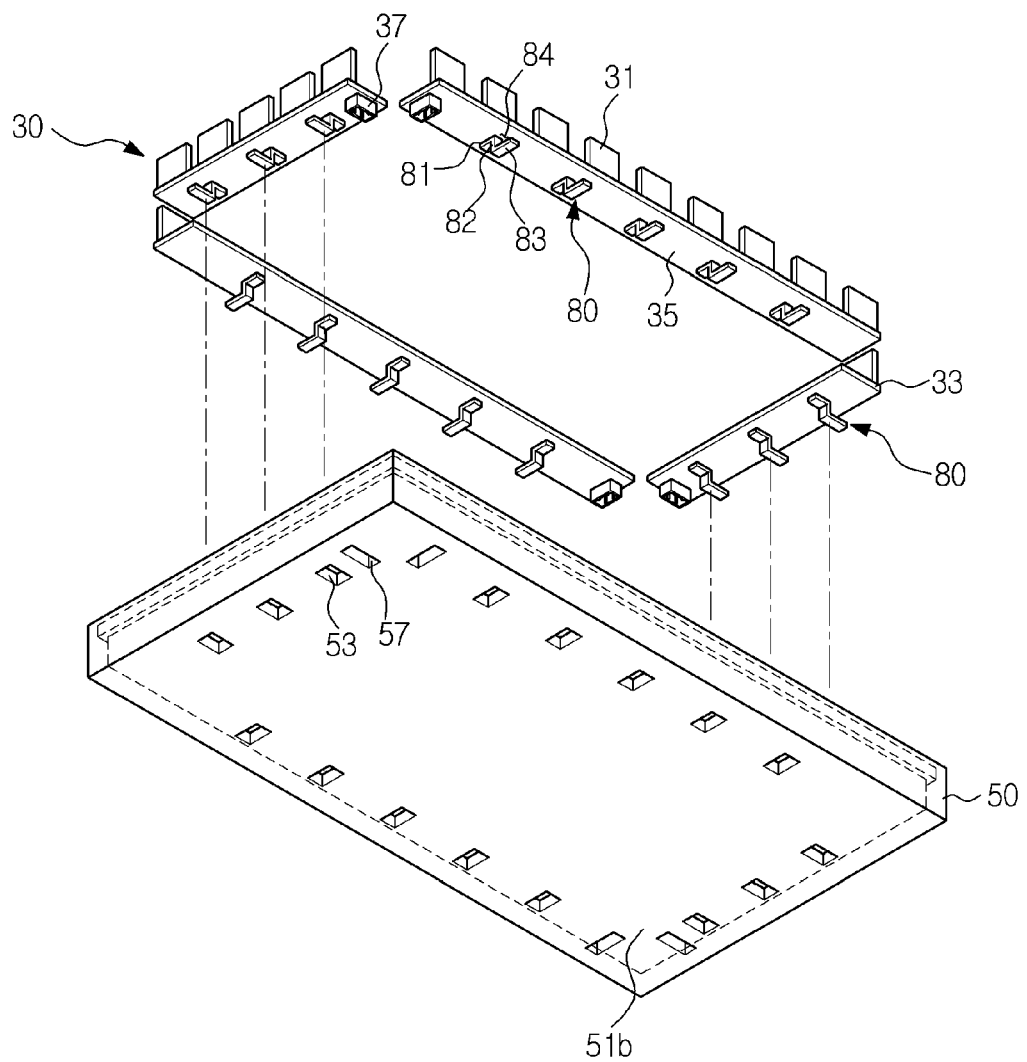
FIG. 3 is an exploded perspective view illustrating a combined structure of a light source unit in an LCD device according to an exemplary embodiment.
Figure 4:
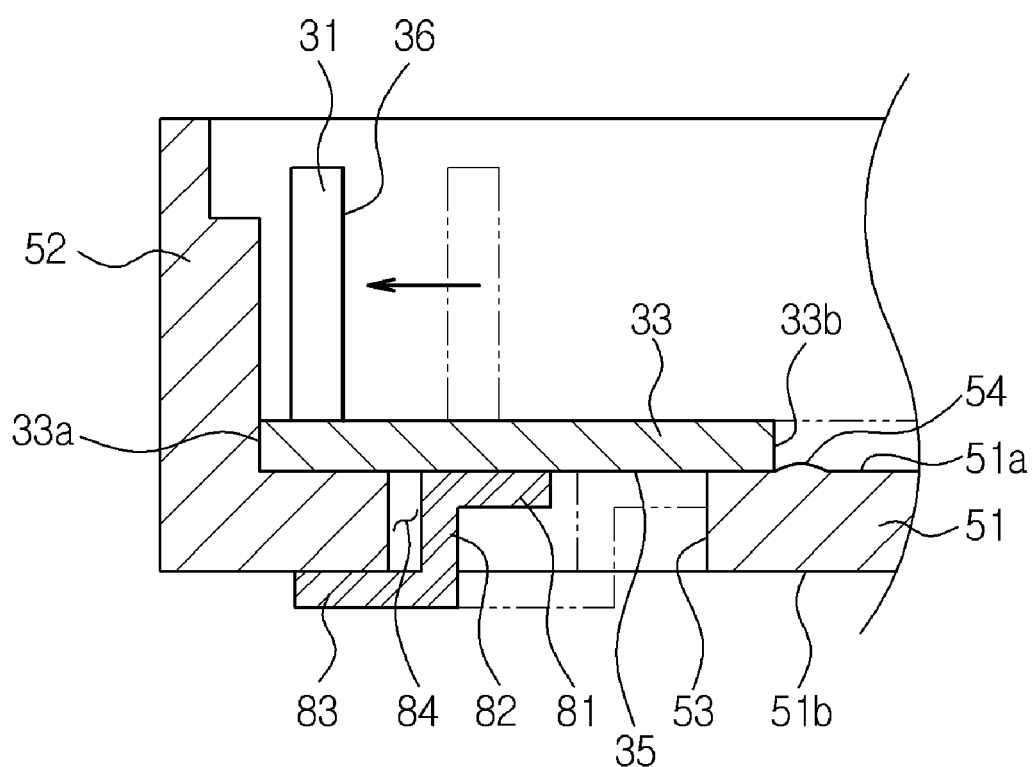
FIG. 4 is a cross-sectional view illustrating a mechanism for connecting a light source unit to a bottom chassis according to an exemplary embodiment.

FIG. 3 is an exploded perspective view illustrating a combined structure of a light source unit in an LCD device according to an exemplary embodiment; and FIG. 4 is a cross-sectional view illustrating a mechanism for connecting a light source unit to a bottom chassis according to an exemplary embodiment.

Referring to FIGS. 3 and 4, the light source unit 30 may include the coupling part 80 to maintain substantially close coupling of the PCB 33 to the bottom side 51 of the bottom chassis 50.

The coupling part 80 may be mounted on the rear side of the PCB 33 by surface mount technology, or other equivalent technology as would be understood by those skilled in the art. In this regard, when the PCB 33 is fixed to the bottom chassis 50 using a clamp screw, etc., damage may not be caused by interference (or contact) between a head part of the screw and surrounding structures.

The coupling part 80 is generally fabricated using a thin metal plate with a small overall thickness, and has a support part 81 fixed to the rear side of the PCB 33 and two fixing parts (that is, retainers) 82 and 83, which are bent in a vertical direction from one end of the support part 81 followed by being bent in a horizontal direction therefrom, thus forming a fitting slot 84 into which the bottom side 51 of the bottom chassis 50 is inserted.

More particularly, the retainers 82 and 83 include a vertical part 82 expending in a vertical direction from the rear side 35 of the PCB 33 and a horizontal part 83 expending in a horizontal direction from one end of the vertical part 82.

The fitting slot 84 is formed by a space between the rear side 35 of the PCB 33 and the horizontal part 83 and may have a size corresponding to a thickness of the bottom side 51 of the bottom chassis 50.

That is, a space S between the horizontal part 83 and the PCB 33 is substantially equal to a thickness T of the bottom side 51 of the bottom chassis 50, as shown in FIG. 2.

Furthermore, the bottom chassis 50 may have a perforated open hole 53 on the bottom side 51 thereof, on which the PCB is mounted, at a site corresponding to the coupling part 80.

The coupling part 80 extending from the rear side of the PCB 33 passes through the open hole 53 and couples (e.g., slidably) the PCB 33 to the bottom chassis 50.

A position fixing protrusion 54 may be provided on an inner face 51a of the bottom side 51 adjacent to the open hole 53, to restrict movement of the PCB 33 coupled by the coupling part 80, while guiding the PCB 33 to the correct position.

A process for coupling the PCB 33 to the bottom chassis 50 according to an exemplary embodiment is provided below.

As shown in FIG. 3, the coupling part 80 placed on the rear side 35 of the PCB 33 having LEDs 31 mounted thereon is inserted into the corresponding open hole 53 of the bottom chassis 50.

The fitting slot 84 of the coupling part 80 passes through the open hole 53 and faces the bottom side 51 (an imaginary line portion) as shown in FIG. 4. Thereafter, the PCB 33 slides horizontally until one side 33a of the PCB 33 is in contact with a lateral side 52 of the bottom chassis 50.

The bottom side 51 is inserted into the fitting slot 84 and the other side 33b of the PCB 33 is supported on the position fixing protrusion 54, in turn securing the light source unit 30 and the bottom chassis 50 to each other.

To secure the light source unit 30 to the bottom chassis 50, the coupling part 80 according to the foregoing exemplary embodiment extends from the PCB 33, passes through the open hole 53 of the bottom side 51, and contacts an outer face of the bottom side 51. As a result, the rear side 35 of the PCB 33 may be closely secured to the inner face 51a of the bottom side 51 of the bottom chassis 50.

According to the foregoing exemplary embodiments, heat generated from the PCB 33 is dissipated outward through the bottom chassis 50 or the coupling part 80, which may be related to heat discharge performance of the PCB 33.

The coupling part 80 is not limited in terms of structure or morphology thereof, so long as the coupling part 80 extends from the PCB 33, passes through the open hole 53 and contacts an outer face of the bottom side 51, thus securing the PCB 33 to the bottom chassis 50. Other structures as understood by those skilled in the art may be substituted therefor.

Hereinafter, the coupling part according to different exemplary embodiments will be described in detail. The same reference numbers referring to same elements as described in the foregoing exemplary embodiments and a detailed description thereof will be omitted.

Figure 5:
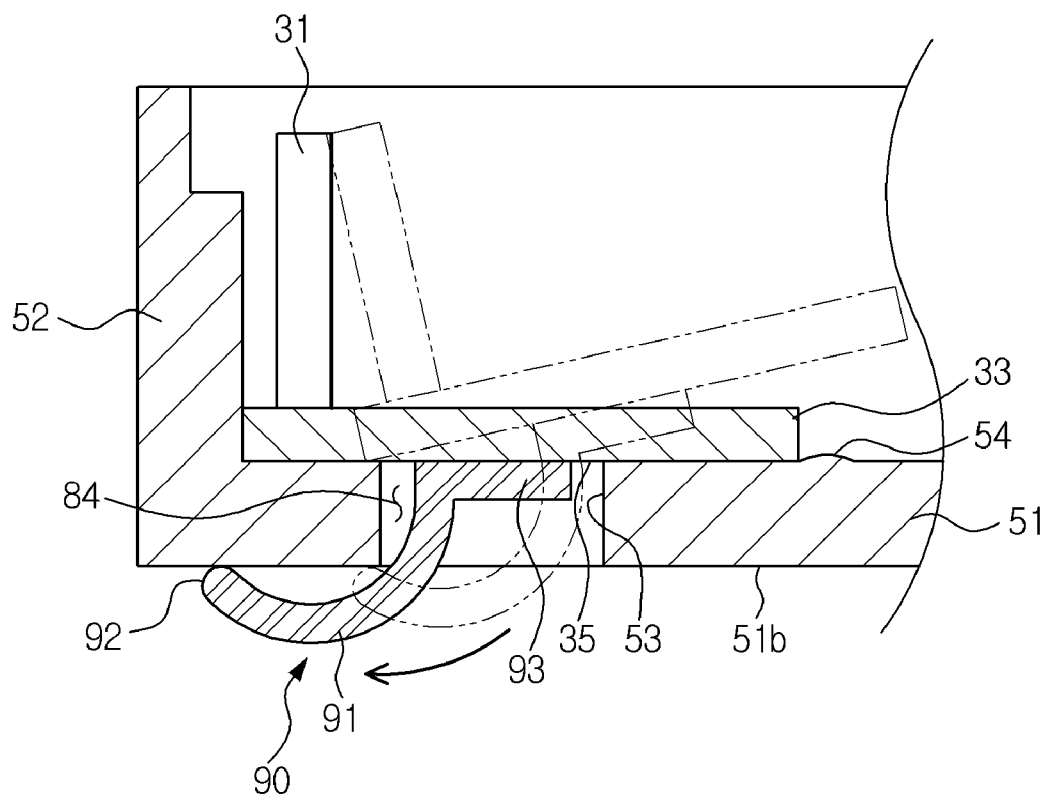
FIG. 5 illustrates a coupling part according to another exemplary embodiment.

FIG. 5 illustrates a coupling part according to another exemplary embodiment. A coupling part 90 may include an elastic element 91 which has a free end 92 extending from a rear side 35 of a PCB 33 and coming into contact with an outer face 51b of a bottom side 51 by elastic strain.

Such an elastic element 91 extends in a substantially curved form from one end of a support part 93 fixed to the rear side 35 of the PCB 33 while having elastic properties, in turn forming a fitting slot 84 with an open end.

The elastic element 91 is not particularly limited in terms of structure or morphology thereof, so long as the fitting slot 84, into which the bottom side 51 is inserted, may be elastic. Since an input port of the fitting slot 84 is elastically opened and grips the bottom side 51, the PCB 33 may be secured.

Figure 6:
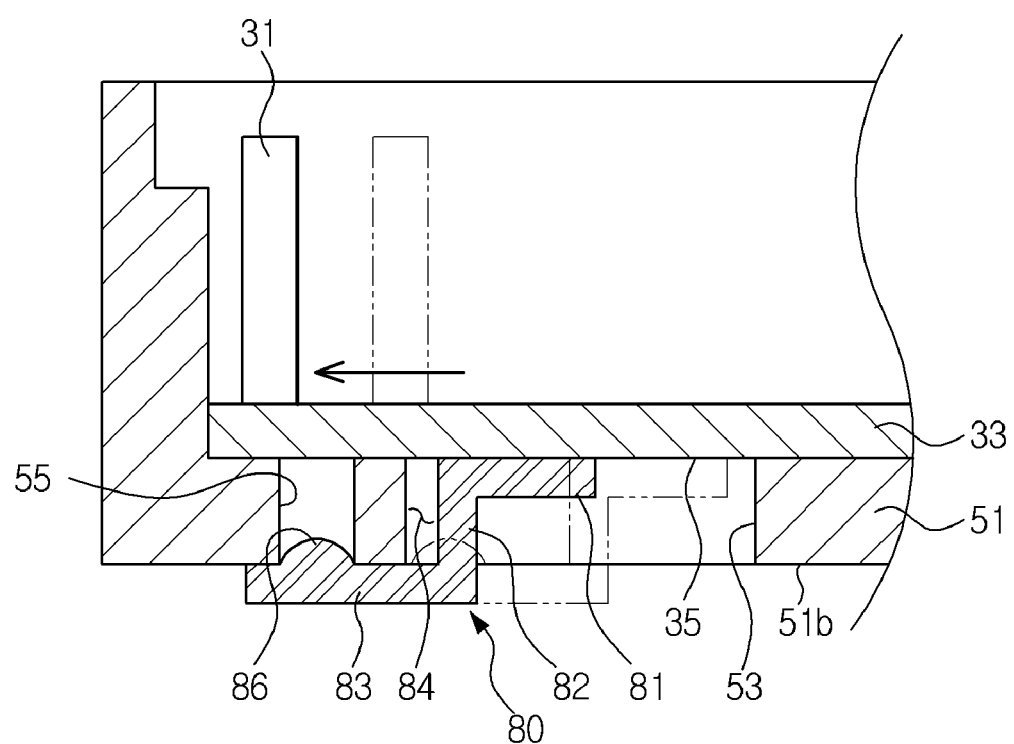
FIG. 6 illustrates a coupling part according to a further exemplary embodiment.

FIG. 6 illustrates a coupling part according to a further exemplary embodiment. A coupling part 80 is substantially similar to the exemplary coupling part shown in FIG. 4, except that a constitutional element having the same role as the position fixing protrusion 54 shown in FIG. 4 protrudes from an inner face 51a of a bottom side 51 to restrict horizontal movement of the PCB 33.

A hook protrusion 86 protruded toward the bottom side 51 is provided on a horizontal part 83 of the coupling part 80. Also, a hook groove 55 with which the hook protrusion 86 is engaged and supported during coupling of the PCB 33 may be formed at a site corresponding to the hook protrusion 86 on the bottom side 51.

The hook protrusion 86 guides the PCB 33 to a coupling position and limits horizontal movement thereof after coupling, so that coupling effects of the PCB 33 may occur.

Figure 7:
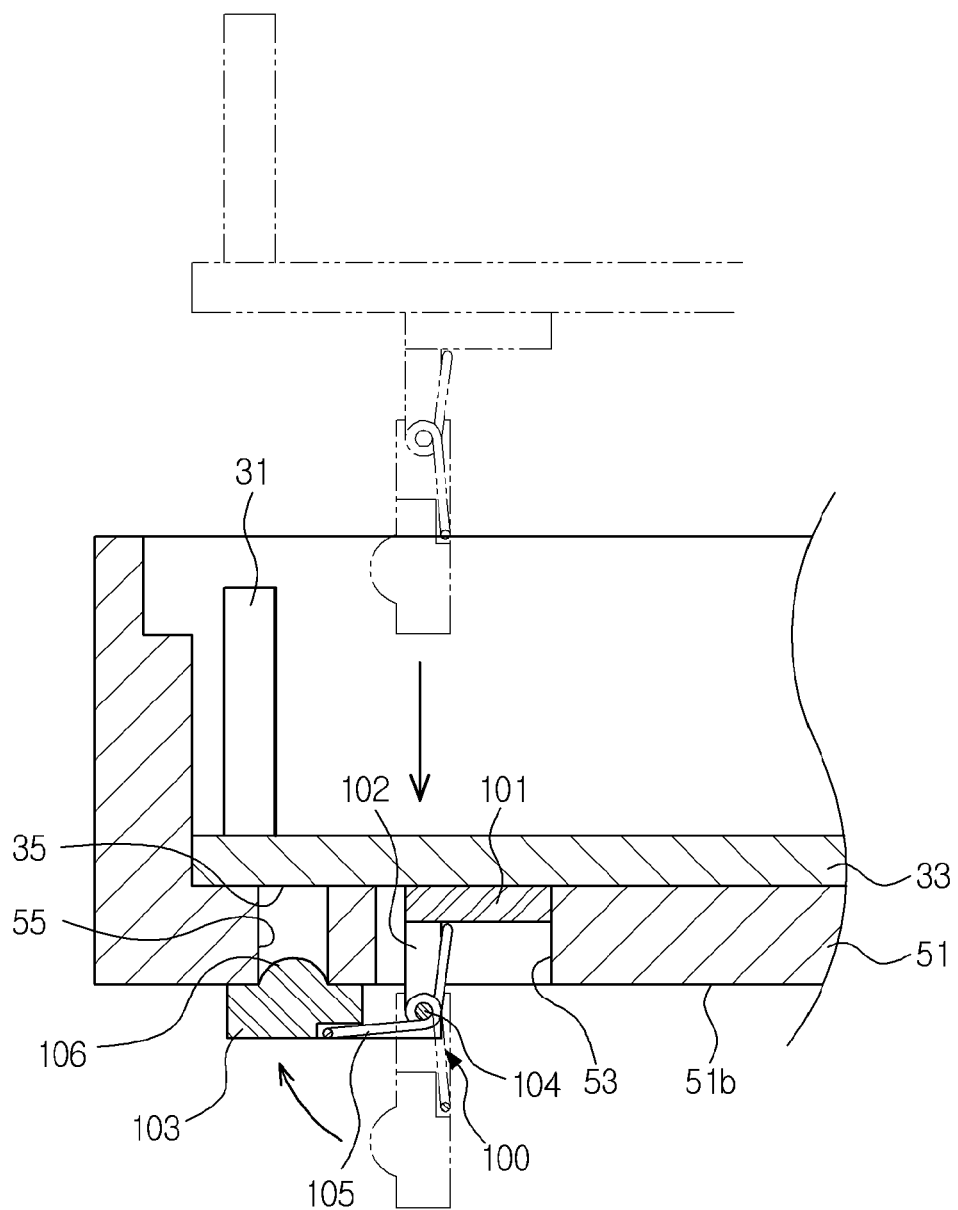
FIG. 7 illustrates a coupling part according to a still further exemplary embodiment.

FIG. 7 illustrates a coupling part according to a still further exemplary embodiment. A coupling part 100 may have a hinge structure to allow a PCB 33 to be mounted vertically.

The coupling part 100 may include a support part 101 fixed to a rear side 35 of the PCB 33, an extending part 102 bent in a vertical direction from one end of the support part 101, a lever part 103 combined with one end of the extending part 102, which can rotate around a rotational axis 104, and an elastic element 105 to elastically support the lever part 103 so that the lever part can apply a force to the bottom side 51.

The lever part 103 is elastically supported by the elastic element 105 and presses an outer face 51b of the bottom side 51, thus permitting the PCB 33 to contact (e.g., firmly) the bottom side 51 and maintain a connection (e.g., stable) between each other.

The elastic element 105 may include a torsion spring wherein one end of the torsion spring is supported on the extending part 102 while the other end is supported on the lever part 103, relative to the rotational axis 104.

When the PCB 33 is coupled to the bottom side 51, the lever part 103 may further include a hook protrusion 106 to restrict horizontal movement of the PCB 33 while a hook groove 55 corresponding to the hook protrusion 106 may be provided on the bottom side 51.

Although exemplary embodiments have been shown and described, the foregoing exemplary embodiments do not particularly restrict the scope of the inventive concept. Those skilled in the art will fully appreciate that various changes and/or modifications may be made without departing from the scope and spirit of the inventive concept defined in the appended claims and their equivalents.

What is claimed is:

1. A liquid crystal display (LCD) module comprising:
an LCD panel;
a bottom chassis having a lateral side and a bottom side that supports the LCD panel, wherein at least one open hole is formed on the bottom side;
a printed circuit board (PCB);
a plurality of light emitting diodes (LEDs) that are mounted on the PCB; and
at least one coupling part that is provided on a bottom of the PCB and is formed to correspond to the open hole, wherein the coupling part partially passes through the open hole and partially contacts the bottom side of the bottom chassis to secure the PCB to the bottom chassis, wherein the coupling part comprises a support part fixed to a rear side of the PCB, and a fixing part extending from the support part and passing through the open hole to contact a rear side of the bottom chassis.

2. The LCD module according to claim 1, wherein the fixing part comprises a fitting slot that is slidably insertable into the open hole, after the fixing part extends from the support part and passes through the open hole, so as to support the rear side of the PCB while the PCB faces the bottom side of the bottom chassis.

3. The LCD module according to claim 2, wherein the fixing part comprising the fitting slot has a vertical part that protrudes from the support part and a horizontal part that is bent at one end of the vertical part and extends parallel, and a distance between the horizontal part and the PCB is substantially identical to a thickness of the bottom side of the bottom chassis.

4. The LCD module according to claim 3, wherein the fixing part comprises a hook protrusion that protrudes from the horizontal part, and the bottom chassis comprises a hook groove that provided near the open hole on the rear side of the bottom chassis and with which the hook protrusion is slidably engaged by movement of the PCB.

5. The LCD module according to claim 1, wherein the fixing part extends in a curved manner from the support part, to couple the PCB to the bottom chassis through elastic strain.

6. The LCD module according to claim 1, wherein the fixing part comprises an extending part extending from the support part, a rotational lever part on the extending part, and an elastic element which elastically supports and presses the rear side of the bottom chassis.

7. The LCD module according to claim 6, wherein the lever part comprises a hook protrusion, and the bottom chassis comprises a hook groove corresponding to the hook protrusion provided near the open hole at the rear side of the bottoms chassis.

8. The LCD module according to claim 6, wherein the elastic element comprises a torsion spring combined with one of the lever part and a rotational axis of the extending part.

9. The LCD module according to claim 1, further comprising a position fixing protrusion that protrudes from the bottom side of the bottom chassis and supports one side of the PCB, to restrict movement of the PCB while the PCB is guided to a coupling position.

10. The LCD module according to claim 1, wherein each of the LEDs comprises a light emitting part to irradiate light, which is arranged substantially perpendicular to a surface of the PCB having the LEDs mounted thereon, and the light is emitted in a direction substantially parallel to the PCB.

11. The LCD module according to claim 10, further comprising:
a light guide part having a plane for light incidence that faces the light emitting part and a light exit plane perpendicular to the light incidence plane, to guide the light irradiated from the light emitting part, wherein at least a part of the PCB is disposed below the light guide part.

12. The LCD module according to claim 11, wherein a reflection part to direct the irradiated light from the light emitting part toward the PCB panel is provided at a bottom end of the light guide part.

13. The LCD module according to claim 12, wherein the reflection part is disposed above the bottom side and covers a part of the PCB.

14. The LCD module according to claim 11, wherein a rear side of the LEDs on the opposite side of the light emitting part is arranged adjacent to the lateral side of the bottom chassis.

15. The LCD module according to claim 1, wherein the PCB comprises a connector to supply power to the LEDs.

16. The LCD module according to claim 15, wherein the connector protrudes toward the rear side of the PCB, and the bottom chassis has a connector coupling hole corresponding to the connector on the bottom side thereof.

17. A liquid crystal display (LCD) device comprising:
an LCD panel;
a bottom chassis having a lateral side and a bottom side to support the LCD panel, wherein at least one open hole is formed on the bottom side;
a printed circuit board;
a plurality of light emitting diodes that are mounted on the PCB; and
at least one coupling part that is provided on a bottom of the PCB and is formed to correspond to the open hole, wherein the coupling part partially passes through the open hole and partially contacts the bottom side of the bottom chassis to secure the PCB to the bottom chassis, wherein the coupling part comprises a support part fixed to a rear side of the PCB, and a fixing part extending from the support part and passing through the open hole to contact a rear side of the bottom chassis.

18. The LCD device according to claim 17, wherein the fixing part comprises a fitting slot slidably inserted into the open hole, after the fixing part extends from the support part and passes through the open hole so as to support the rear side of the PCB while the PCB faces the bottom side of the bottom chassis.

19. The LCD device according to claim 18, wherein the fixing part having the fitting slot has a vertical part that protrudes from the support part and a horizontal part which is bent at one end of the vertical part and then extends substantially parallel, wherein a distance between the horizontal part and the PCB is substantially equal to a thickness of the bottom side of the bottom chassis.

20. The LCD device according to claim 19, wherein the fixing part comprises a hook protrusion of the horizontal part, and the bottom chassis comprises a hook groove that is provided near the open hole on the rear side of the bottom chassis and with which the hook protrusion is slidably and engaged by sliding movement of the PCB.

21. The LCD device according to claim 17, wherein the fixing part extends in a curved manner from the support part, to maintain coupling of the PCB and the bottom chassis through elastic strain.

22. The LCD device according to claim 17, wherein the fixing part comprises an extending part extending from the support part, a rotational lever part positioned on the extending part, and an elastic element that elastically supports and applies force to the rear side of the bottom chassis.

23. The LCD device according to claim 22, wherein the lever part comprises a hook protrusion, and the bottom chassis comprises a hook groove corresponding to the hook protrusion provided near the open hole at the rear side of the bottom chassis.

24. The LCD device according to claim 22, wherein the elastic element comprises a torsion spring combined with one of the lever part and a rotational axis of the extending part.

25. The LCD device according to claim 17, further comprising a position fixing protrusion protruding from the bottom side of the bottom chassis and supporting one side of the PCB.

26. The LCD device according to claim 17, wherein each of the LEDs has a light emitting part to irradiate light, which is arranged substantially perpendicular to a surface of the PCB having the LEDs mounted thereon, and the light is emitted in a direction substantially parallel to the PCB.

27. The LCD device according to claim 26, further comprising:
a light guide part which has a plane for light incidence facing the light emitting part and a light exit plane substantially perpendicular to the light incidence plane, to guide the light irradiated from the light emitting part, and wherein at least a part of the PCB is placed below the light guide part.

28. The LCD device according to claim 27, wherein a reflection part to direct the irradiated light from the light emitting part toward the PCB panel is provided at a bottom end of the light guide part.

29. The LCD device according to claim 28, wherein the reflection part is disposed above of the bottom side and covers a part of the PCB.

30. The LCD device according to claim 27, wherein a rear side of the LEDs on the opposite side of the light emitting part is adjacent to the lateral side of the bottom chassis.

31. The LCD device according to claim 17, wherein the PCB comprises a connector that supplies power to the LEDs.

32. The LCD device according to claim 31, wherein the connector protrudes toward the rear side of the PCB, and the bottom chassis comprises a connector coupling hole corresponding to the connector on the bottom side thereof.

33. The LCD device according to claim 17, further comprising a driver PCB having a driver circuit part which is mounted thereon and electrically connected thereto, wherein the driver PCB is fixed to the rear side of the bottom chassis.

* * * * *